(12) United States Patent
Sakai

(10) Patent No.: US 9,073,146 B2
(45) Date of Patent: Jul. 7, 2015

(54) PRESSURE CONTROL METHOD FOR SPOT WELDING APPARATUS

(71) Applicant: FUJI JUKOGYO KABUSHIKI KAISHA, Tokyo (JP)

(72) Inventor: Kensuke Sakai, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 254 days.

(21) Appl. No.: 13/649,035

(22) Filed: Oct. 10, 2012

(65) Prior Publication Data

US 2013/0092671 A1      Apr. 18, 2013

(30) Foreign Application Priority Data

Oct. 13, 2011   (JP) ................................. 2011-225469

(51) Int. Cl.
*B23K 11/11*    (2006.01)
*B23K 11/31*    (2006.01)
*B23K 11/25*    (2006.01)

(52) U.S. Cl.
CPC ............. *B23K 11/315* (2013.01); *B23K 11/115* (2013.01); *B23K 11/255* (2013.01)

(58) Field of Classification Search
USPC ..................... 219/87, 89, 90, 91.1, 91.2, 127
See application file for complete search history.

(56) References Cited

U.S. PATENT DOCUMENTS 6,515,251 B1 *   2/2003   Wind ........................... 219/86.1
2012/0055910 A1   3/2012   Sakai et al.

FOREIGN PATENT DOCUMENTS

JP          2003-251469 A       9/2003
JP          2012-0055924 A      3/2012

* cited by examiner

*Primary Examiner* — Brian Jennison
(74) *Attorney, Agent, or Firm* — McGinn IP Law Group, PLLC

(57) ABSTRACT

There is provided a pressure control method for a spot welding apparatus. Upon spot-welding a workpiece while applying a preset pressure to the workpiece by a pressure actuator through a movable electrode and a fixed electrode holding a workpiece and applying a preset sub-pressure by a sub-pressure actuator through a sub-pressure unit, the workpiece is pressed with an initial pressure by the movable electrode and the fixed electrode, and an initial sub-pressure is applied through the sub-pressure unit. After that, the setting pressure is applied to the workpiece by the pressure actuator through the movable electrode and the fixed electrode, and the setting sub-pressure is applied by the sub-pressure actuator through the sub-pressure unit.

11 Claims, 9 Drawing Sheets

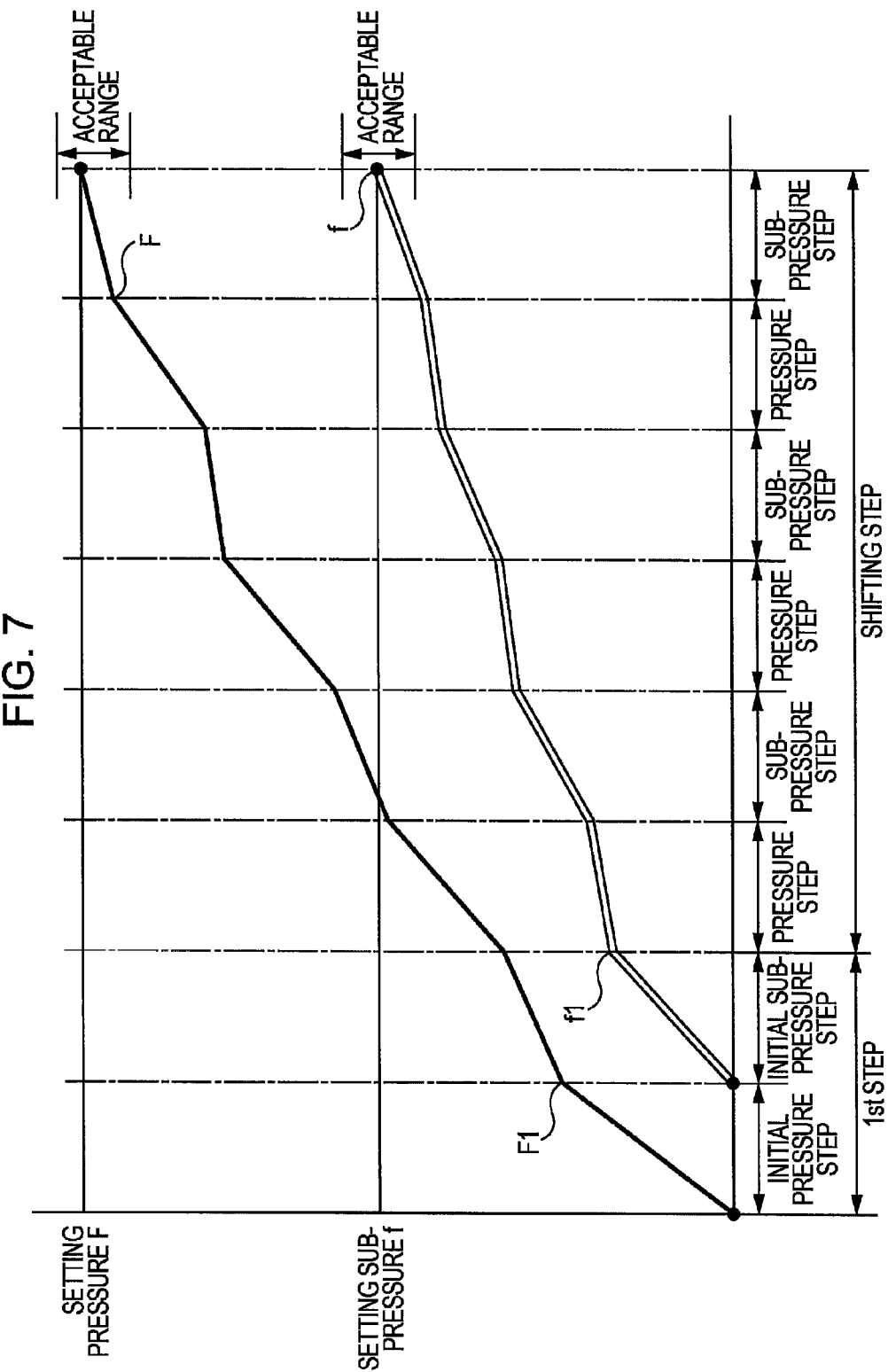

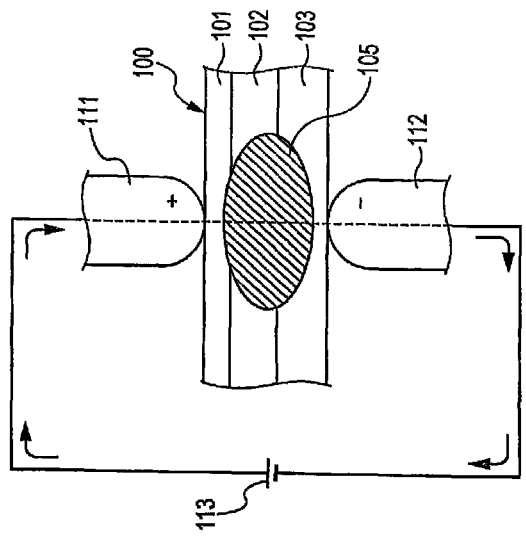
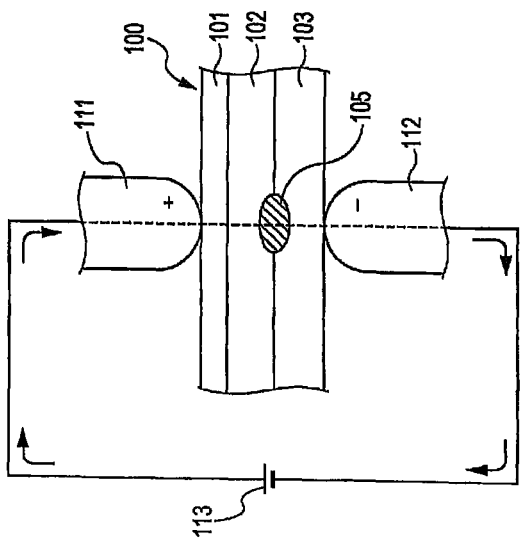

PRESSURE CONTROL METHOD FOR SPOT WELDING APPARATUS

CROSS-REFERENCE TO RELATED APPLICATIONS

The present application claims priority from Japanese Patent Application No. 2011-225469 filed on Oct. 13, 2011, the entire contents of which are hereby incorporated by reference.

BACKGROUND OF THE INVENTION

1. Field of the Invention

The present invention relates to a pressure control method for a spot welding apparatus that spot-welds a workpiece.

2. Description of the Related Art

Generally, a spot welding technique is widely used for joining stacked plates, such as steel plates. The spot welding technique involves using a pair of welding electrodes to hold and apply pressure to the stacked plates, and applying a current between the welding electrodes for a predetermined time period.

Referring to FIG. 8A, when spot-welding a workpiece 100 in the form of a plate assembly including three stacked plates, i.e., a thin plate 101 having a lower rigidity, and a first thick plate 102 and a second thick plate 103 having a higher rigidity than the thin plate 101, a movable electrode 111 and a fixed electrode 112 hold the workpiece 100 therebetween such that the thin plate 101 is in tight contact with the first thick plate 102, and that the first thick plate 102 is in tight contact with the second thick plate 103. Then, when a power source 113 applies a current to the workpiece 100 through the movable electrode 111 and the fixed electrode 112, the current density in an electric path between the movable electrode 111 and the fixed electrode 112 becomes substantially uniform. Thus, a good nugget is formed that extends from the thin plate 101 to the second thick plate 103, thereby achieving the required weld strength.

In actuality, however, when the workpiece 100 is held and pressed between the movable electrode 111 and the fixed electrode 112, the thin plate 101 having a lower rigidity and the first thick plate 102 bend upward, causing gaps to form between the thin plate 101 and the first thick plate 102 as well as between the first thick plate 102 and the second thick plate 103.

In this case, the contact area between the movable electrode 111 and the thin plate 101 is increased due to the bending of the thin plate 101, whereas the contact area of the joint section between the thin plate 101 and the first thick plate 102 and the contact area of the joint section between the first thick plate 102 and the second thick plate 103 are reduced due to the gaps. Therefore, the current density between the movable electrode 111 and the fixed electrode 112 at the second thick plate 103 side becomes higher than that at the thin plate 101 side. This results in a greater local calorific value between the first thick plate 102 and the second thick plate 103 than between the thin plate 101 and the first thick plate 102.

As a result, as shown in FIG. 8A, a nugget 105 is first formed at the joint section between the first thick plate 102 and the second thick plate 103. Then, as shown in FIG. 83, the nugget 105 gradually grows so that the thin plate 101 and the first thick plate 102 are ultimately welded to each other. However, because the amount of weld penetration between the thin plate 101 and the first thick plate 102 is small, the weld strength is poor. Thus, the thin plate 101 may be separated from the first thick plate 102, and the welding quality varies. This problem becomes prominent particularly when the thickness of the first thick plate 102 and the thickness of the second thick plate 103 are increased since the increased thicknesses make it difficult for the nugget 105 to reach the joint section between the first thick plate 102 and the thin plate 101.

Japanese Unexamined Patent Application Publication (JP-A) No. 2003-251469 discloses an example of a spot welding method as a countermeasure against this problem. Specifically, as shown in FIG. 9, when spot-welding the workpiece 100 formed of three stacked plates, i.e., the thin plate 101, the first thick plate 102, and the second thick plate 103, pressure of a movable electrode 125 at the thin plate 101 side is set to be lower than pressure of a fixed electrode 124 at the second thick plate 103 side. Thus, the contact resistance between the thin plate 101 and the first thick plate 102 is increased, whereas the contact resistance between the first thick plate 102 and the second thick plate 103 is reduced. Accordingly, when a current is applied between the movable electrode 125 and the fixed electrode 124, the calorific value at the joint section between the thin plate 101 and the first thick plate 102 is increased, thereby increasing the weld strength between the thin plate 101 and the first thick plate 102.

FIG. 10 illustrates the configuration of a spot welding apparatus used for implementing this method. Specifically, a spot welding apparatus 120 is attached to a wrist 116 of a welding robot 115. The spot, welding apparatus 120 includes a base 122 that is vertically movably supported by a linear guide 121. The linear guide 121 is fixed to a support bracket 117 attached to the wrist 116. A fixed arm 123 extending downward is provided on the base 122. The fixed electrode 124 is provided at a distal end of the fixed arm 123.

A pressure actuator 126 is attached to an upper end of the base 122 and is configured to move a rod 127 vertically. The movable electrode 125 is attached to a lower end of the rod 127 so as to face the fixed electrode 124. A servomotor 128 is attached to an upper end of the support bracket 117. The servomotor 128 is configured to move the base 122 vertically by means of a ball screw mechanism.

In accordance with teaching data stored in advance in a controller (not shown), the controller first causes the servomotor 128 to move the base 122 upward so as to bring the fixed electrode 124 into contact with a lower surface of the workpiece 100, and causes the pressure actuator 126 to move the movable electrode 125 downward so as to bring the movable electrode 125 into contact with an upper surface of the workpiece 100 clamped by a clamper 118. In this case, the pressure of the pressure actuator 126 is uniformly applied to the movable electrode 125 and the fixed electrode 124 through the base 122 and the fixed arm 123. Thus, the workpiece 100 is held and pressed by a pressure FL of the fixed electrode 124 and a pressure FU of the movable electrode 125.

Then, the servomotor 128 moves the base 122 upward so as to set the pressure of the movable electrode 125 to be lower than the pressure of the fixed electrode 124. Then, the current density between the thin plate 101 and the first thick plate 102 becomes relatively higher. Thus, a sufficient calorific value can be obtained at the joint section between the thin plate 101 and the first thick plate 102, thereby achieving an increased amount of weld penetration and increased weld strength.

According to the above JP-A-2003-251469, the fixed electrode 124 is brought into contact with the second thick plate 103 of the workpiece 100 clamped by the clamper 118, and the movable electrode 125 is brought into contact with the thin plate 101. Further, the pressure of the movable electrode 125 is set to be lower than the pressure of the fixed electrode 124 by moving the base 122 upward. Then, the current density between the thin plate 101 and the first thick plate 102 becomes relatively higher. Thus, a sufficient calorific value can be obtained at the joint section between the thin plate 101 and the first thick plate 102, thereby achieving an increased amount of weld penetration and increased weld strength.

However, when setting the pressure FU of the movable electrode 125 to be lower than the pressure FL of the fixed electrode 124 by moving the base 122 while the workpiece 100 is held by the clamper 118 and is held and pressed between the fixed electrode 124 and the movable electrode 125, a large load is placed on the clamper 118 clamping the workpiece 100. On the other hand, if the position of the workpiece 100 clamped by the clamper 118 and the welding position of the workpiece 100 are significantly distant from each other, the workpiece 100 deforms and bends. This causes the pressure of the fixed electrode 124 and the pressure of the movable electrode 125 to vary, making it difficult to obtain stable contact resistance between the thin plate 101 and the first thick plate 102 and stable contact resistance between the first thick plate 102 and the second thick plate 103. This may result in variations in the current density at the joint sections, leading to reduced spot welding quality.

In order to solve such problems, the applicant of the present patent application has proposed, in JP-A No. 2012-055924, a spot welding apparatus schematically shown in FIG. 11. This spot welding apparatus holds and presses a weld section of a workpiece 100 between a fixed electrode 132 and a movable electrode 131, which is actuated by a pressure actuator, with a predetermined pressure F, i.e., with a pressure FU of the movable electrode 131 and a pressure FL of the fixed electrode 132 (F=FU+FL). Further, the spot welding apparatus causes a sub-pressure applying actuator (not shown) to press a sub-pressure unit 133 against a thin plate 101 of the workpiece 100 and thereby apply a sub-pressure f to the workpiece 100 such that the pressure of the fixed electrode 132 applied to a thin plate 101 side is controlled to be lower than the pressure of the movable electrode 131 applied to a second thick plate 103 side. Then, the spot welding apparatus applies a current between the movable electrode 131 and the fixed electrode 132 and thereby performs welding.

In this spot welding apparatus, the sub-pressure f is applied to the workpiece 100 by the sub-pressure actuator, while holding and pressing the workpiece 100 between the movable electrode 131 actuated by the pressure actuator and the fixed electrode 132 with the preset pressure F. Therefore, the preset pressure F by the movable electrode 131 and the fixed electrode 132 might be increased due to the application of the sub-pressure f. Accordingly, the pressure actuator and the sub-pressure actuator need to be appropriately controlled. In particular, in the case where the pressure actuator includes an air cylinder mechanism, the effects on the pressure F are relatively small due to a contraction function of the air cylinder. However, in the case where the pressure actuator includes a servomotor, the control thereof is more troublesome due to a high mechanical resistance of the servomotor.

SUMMARY OF THE INVENTION

Accordingly, it is an object of the present invention to provide a pressure control method for a spot welding apparatus that can achieve high welding quality by controlling pressure and sub-pressure that are applied to a workpiece by welding electrodes.

According to a first aspect of the present invention, there is provided a pressure control method for a spot welding apparatus, wherein the spot welding apparatus includes a first welding electrode; a pressure actuator configured to apply a pressure to a second welding electrode, the electrodes holding therebetween a workpiece; and a sub-pressure actuator configured to bring a sub-pressure unit into contact with the workpiece so as to apply a sub-pressure to the workpiece; and wherein the spot welding apparatus is configured to perform spot welding on the workpiece by applying current between the first welding electrode and the second welding electrode to which a preset pressure is applied while holding the workpiece by using the first welding electrode, the second welding electrode, and the sub-pressure unit. The pressure control method includes a first step of applying to the workpiece one of a preset initial pressure by the pressure actuator through the first welding electrode and the second welding electrode holding and pressing the workpiece therebetween and a preset initial sub-pressure by the sub-pressure actuator through the sub-pressure unit being in contact with the workpiece, and subsequently applying the other one of the initial pressure and the initial sub-pressure; and a second step of applying to the workpiece one of a preset setting pressure by the pressure actuator through the first welding electrode and the second welding electrode and a preset setting sub-pressure by the sub-pressure actuator through the sub-pressure unit, and subsequently applying the other one of the setting pressure and the setting sub-pressure, the second step being performed after the first step.

According to the above aspect, upon performing spot welding on the workpiece by applying current between the first welding electrode and the second welding electrode while applying the preset pressure to the workpiece by the pressure actuator through the first welding electrode and the second welding electrode holding the workpiece and applying the preset sub-pressure to the workpiece by the sub-pressure actuator through the sub-pressure unit, in the first step, the pressure actuator causes the first welding electrode and the second welding electrode to hold and press the workpiece with the preset initial pressure, and the sub-pressure actuator brings the sub-pressure unit into contact with the workpiece so as to apply the initial sub-pressure. In the following second step, the pressure actuator causes the first welding electrode and the second welding electrode to apply the preset setting pressure, and the sub-pressure actuator causes the sub-pressure unit to apply the preset setting sub-pressure. Accordingly, the preset pressure by the first welding electrode and the second welding electrode and the preset sub-pressure by the sub-pressure unit are applied to the workpiece with high accuracy. Then, current is applied between the first welding electrode and the second welding electrode so as to perform spot welding on the workpiece to which the preset pressure is applied by the first welding electrode and the second welding electrode and to which the preset sub-pressure is applied by the sub-pressure unit. Thus, high welding quality is achieved.

According to a second aspect of the present invention, there is provided a pressure control method for a spot welding apparatus, wherein the spot welding apparatus includes a first welding electrode; a pressure actuator configured to apply a pressure to a second welding electrode, the electrodes holding therebetween a workpiece; and a sub-pressure actuator configured to bring a sub-pressure unit into contact with the workpiece so as to apply a sub-pressure to the workpiece; and wherein the spot welding apparatus is configured to perform spot welding on the workpiece by applying current between the first welding electrode and the second welding electrode to which a preset pressure is applied while holding the workpiece by using the first welding electrode, the second welding electrode, and the sub-pressure unit. The pressure control method includes a first step of applying to the workpiece one of a preset initial pressure by the pressure actuator through the first welding electrode and the second welding electrode holding and pressing the workpiece therebetween and a preset initial sub-pressure by the sub-pressure actuator through the sub-pressure unit being in contact with the workpiece, and subsequently applying the other one of the initial pressure and the initial sub-pressure; and a shifting step of gradually shifting from a first state in which the workpiece is held and pressed with the initial pressure between the first welding electrode and the second welding electrode and the initial sub-pressure is applied to the workpiece through the sub-pressure unit to a second state in which a preset setting pressure is applied to the workpiece by the pressure actuator through the first welding electrode and the second welding electrode and a preset setting sub-pressure is applied to the workpiece by the sub-pressure actuator through the sub-pressure unit.

According to the above aspect, upon performing spot welding on the workpiece by applying current between the first welding electrode and the second welding electrode while applying the preset pressure to the workpiece by the pressure actuator through the first welding electrode and the second welding electrode holding the workpiece and applying the preset sub-pressure to the workpiece by the sub-pressure actuator through the sub-pressure unit, in the first step, the pressure actuator causes the first welding electrode and the second welding electrode to hold and press the workpiece with the preset initial pressure, and the sub-pressure actuator causes the sub-pressure unit to apply the initial sub-pressure. In the shifting step, the first state in which the workpiece is held and pressed with the initial pressure between the first welding electrode and the second welding electrode and the initial sub-pressure is applied to the workpiece through the sub-pressure unit is gradually shifted to the second state in which the preset setting pressure is applied to the workpiece by the pressure actuator through the first welding electrode and the second welding electrode and the preset setting sub-pressure is applied to the workpiece by the sub-pressure actuator through the sub-pressure unit. Accordingly, the preset pressure by the first welding electrode and the second welding electrode and the preset sub-pressure by the sub-pressure unit are applied to the workpiece with high accuracy. Then, current is applied between the first welding electrode and the second welding electrode so as to perform spot welding on the workpiece to which the preset pressure is applied by the first welding electrode and the second welding electrode and to which the preset sub-pressure is applied by the sub-pressure unit. Thus, high welding quality is achieved.

In the pressure control method for a spot welding apparatus according to the second aspect of the present invention, in the shifting step, pressure application by the pressure actuator through the first welding electrode and the second welding electrode and sub-pressure application by the sub-pressure actuator through the sub-pressure unit may alternately be performed.

Since the pressure application by the pressure actuator through the first welding electrode and the second welding electrode and sub-pressure application by the sub-pressure actuator through the sub-pressure unit are alternately performed, it is possible to apply to the workpiece the preset pressure by the first welding electrode and the second welding electrode and the preset sub-pressure by the sub-pressure unit with high accuracy.

In the pressure control method for a spot welding apparatus according to the second aspect of the present invention, the shifting step may include a plurality of sub-pressure steps of performing sub-pressure application by the sub-pressure actuator through the sub-pressure unit.

Since the shifting step includes a plurality of sub-pressure steps of performing sub-pressure application by the sub-pressure actuator through the sub-pressure unit, it is possible to apply to the workpiece the preset pressure by the first welding electrode and the second welding electrode and the preset sub-pressure by the sub-pressure unit with high accuracy.

In the pressure control method for a spot welding apparatus according to the second aspect of the present invention, the shifting step may include a step of reducing at least one of the pressure applied through the first welding electrode and the second welding electrode and the sub-pressure applied through the sub-pressure unit while gradually shifting to the second state in which the preset setting pressure is applied to the workpiece by the pressure actuator through the first welding electrode and the second welding electrode and the preset setting sub-pressure is applied to the workpiece by the sub-pressure actuator through the sub-pressure unit.

Since the shifting step includes a step of reducing at least one of the pressure applied through the first welding electrode and the second welding electrode and the sub-pressure applied through the sub-pressure unit while gradually shifting to the second state in which the preset setting pressure is applied to the workpiece by the pressure actuator through the first welding electrode and the second welding electrode and the preset setting sub-pressure is applied to the workpiece by the sub-pressure actuator through the sub-pressure unit, it is possible to prevent excess pressure or excess sub-pressure from being applied, and to apply to the workpiece the preset pressure by the first welding electrode and the second welding electrode and the preset sub-pressure by the sub-pressure unit with high accuracy.

According to an embodiment of the present invention, upon performing spot welding on a workpiece by applying current between a first welding electrode and a second welding electrode while applying a preset pressure to the workpiece by a pressure actuator through the first welding electrode and the second welding electrode holding the workpiece and applying a preset sub-pressure to the workpiece by a sub-pressure actuator through a sub-pressure unit, the preset pressure by the first welding electrode and the second welding electrode and the preset sub-pressure by the sub-pressure unit are applied with high accuracy without being affected by the mechanical resistance of the pressure actuator and the like. Then, current is applied between the first welding electrode and the second welding electrode so as to perform spot welding on the workpiece to which the preset pressure is applied by the first welding electrode and the second welding electrode and to which the preset sub-pressure is applied by the sub-pressure unit. Thus, high welding quality is achieved.

BRIEF DESCRIPTION OF THE DRAWINGS

FIG. 7 is a diagram schematically illustrating operations;

FIGS. 8A and 8B are diagrams schematically illustrating a spot welding process according to related art;

DESCRIPTION OF THE PREFERRED EMBODIMENTS

Figure 1:
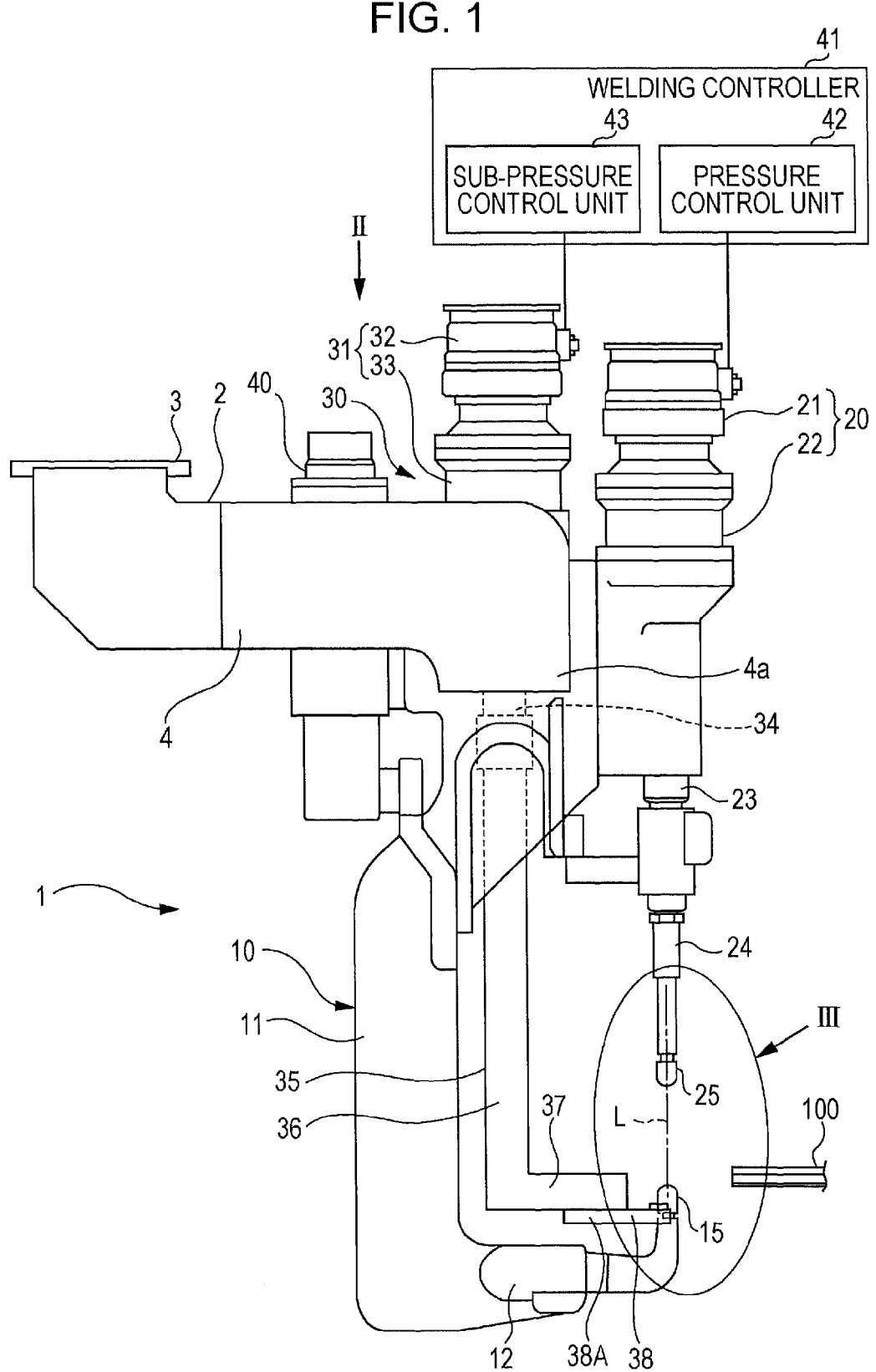
FIG. 1 is a diagram illustrating the configuration of a spot welding apparatus according to an embodiment.
Figure 2:
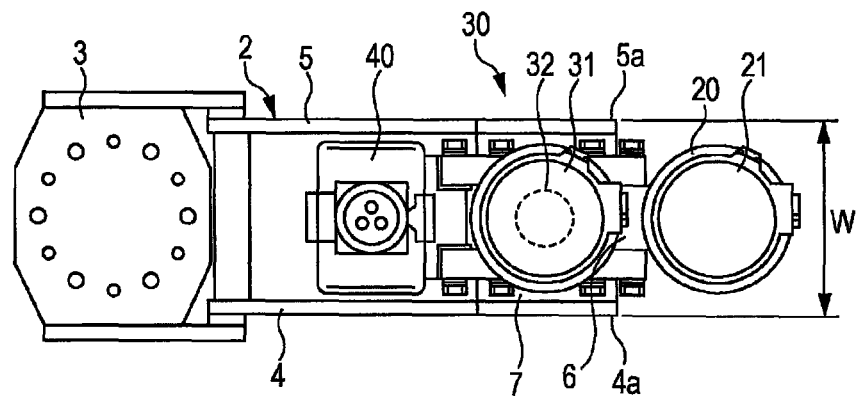
FIG. 2 is a view taken in the direction of the arrow II in FIG. 1.
Figure 3:
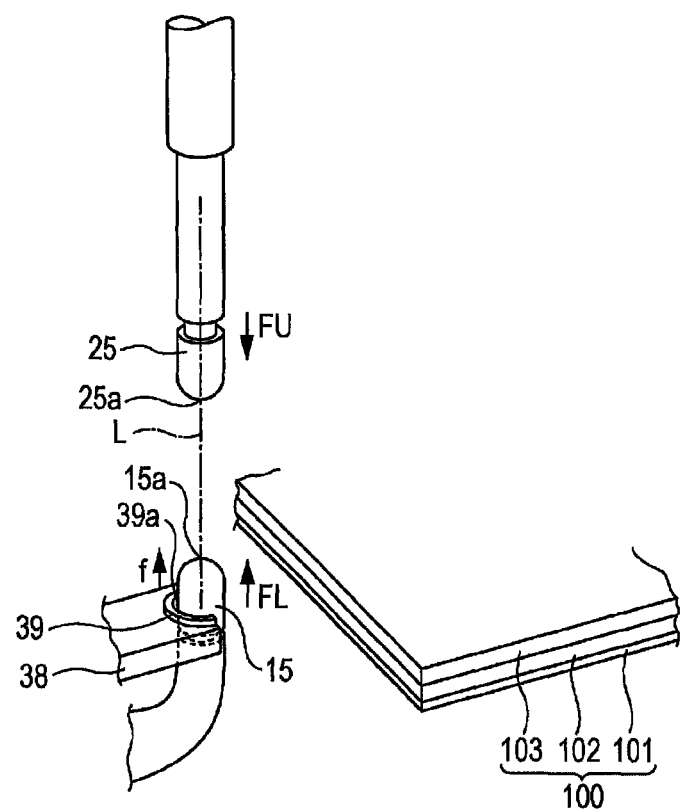
FIG. 3 is an enlarged perspective view illustrating a part indicated by III in FIG. 1.
Figure 4:
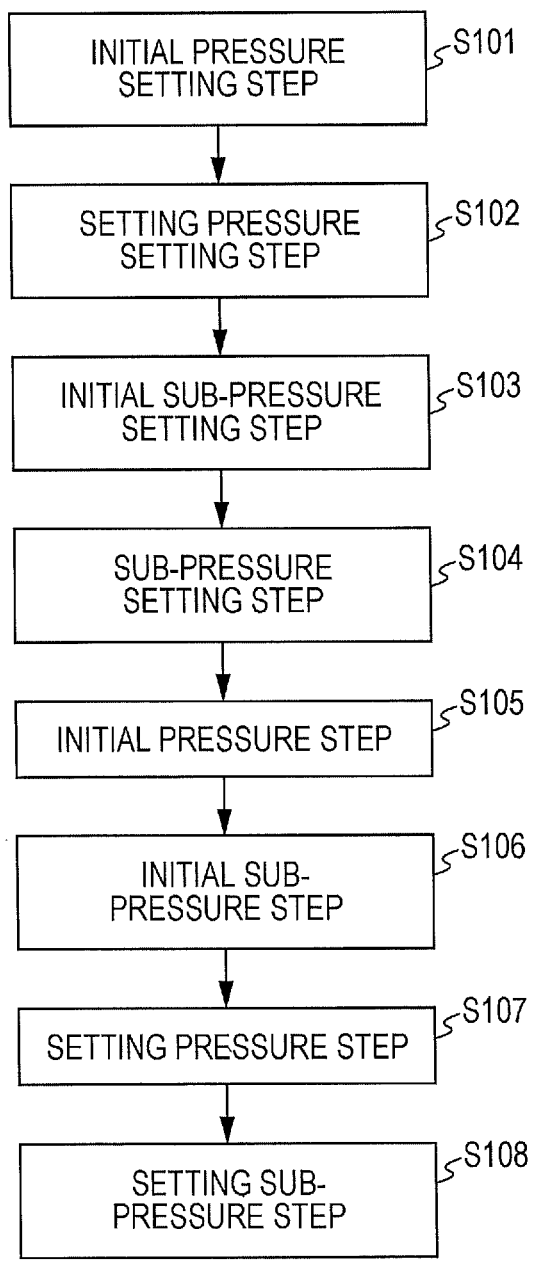
FIG. 4 is a diagram illustrating operation program data.

An embodiment of a pressure control method for a spot welding apparatus according to the present invention will be described with reference to FIGS. 1 through 6. FIG. 1 is a diagram illustrating the configuration of a spot welding apparatus 1. FIG. 2 is a view taken in the direction of the arrow II in FIG. 1. FIG. 3 is an enlarged perspective view illustrating a part indicated by III in FIG. 1. FIG. 4 is a diagram illustrating operation program data. FIGS. 5A through 5F and FIG. 6 are diagrams schematically illustrating operations.

Before describing the spot welding apparatus 1, a workpiece 100 will be described first. Referring to FIG. 3, the workpiece 100 is a three-plate assembly formed by stacking a thin plate over one of two stacked thick plates. More specifically, the workpiece 100 includes a thin plate 101 having a lower rigidity, and a first thick plate 102 and a second thick plate 103 having a greater thickness and a higher rigidity than the thin plate 101. The thin plate 101, the first thick plate 102, and the second thick plate 103 are stacked in this order from the bottom.

The spot welding apparatus 1 includes a base 3 attached to a wrist of a welding robot (not shown) with an equalizer unit interposed therebetween, and a support bracket 2 having side portions 4 and 5 facing each other and extending from the opposite sides of the base 3. A fixed arm 10 is attached to the opposing side portions 4 and 5 of the support bracket 2. A pressure actuator 20 is attached to distal ends 4a and 5a of the side portions 4 and 5, with a bracket 6 interposed therebetween. Further, a sub-pressure actuator 31 of a sub-pressure applicator 30 and a welding transformer 40 are attached and supported between the side portions 4 and 5.

The fixed arm 10 includes a fixed arm main body 11 extending downward and having a base end connected to the opposite side portions 4 and 5 of the support bracket 2, and an electrode holder 12 extending forward from a distal end of the fixed arm main body 11 and bending so as to be in an L shape. A fixed electrode 15 serving as a first welding electrode is attached, with a tip end 15a facing upward, to the electrode holder 12.

The pressure actuator 20 includes a servomotor 21 composed of a hollow motor having a hollow rotor which is rotatably accommodated in a motor housing. The pressure actuator 20 further includes a linear motion unit 22, which has a ball screw attached to an end of the hollow rotor and a rod 23 screwed onto the ball screw. The rod 23 of the linear motion unit 22 is vertically reciprocated by the servomotor 21.

An electrode arm 24 is provided at a lower end of the rod 23 of the linear motion unit 22. A movable electrode 25 serving as a second welding electrode is provided at a distal end of the electrode arm 24. The movable electrode 25 is coaxially aligned with the fixed electrode 15 provided on the fixed arm 10, i.e., is arranged on a central axis L, so as to face the fixed electrode 15.

Thus, the movable electrode 25 is moved by the servomotor 21 of the pressure actuator 20 along the central axis L between a retracted position which is located above and away from the fixed electrode 15 and a pressure applying position where the movable electrode 25 clamps the workpiece 100 together with the fixed electrode 15 and applies pressure.

The pressure F applied to the workpiece 100 by the fixed electrode 15 and the movable electrode 25, i.e., the sum of a pressure FL of the fixed electrode 15 and a pressure FU of the movable electrode 25, is dependent on the rotational torque of the servomotor 21. Accordingly, pressure of a desired magnitude can be obtained by controlling the rotational torque of the servomotor 21.

The sub-pressure applicator 30 includes the sub-pressure actuator 31 held between the opposite side portions 4 and 5 of the support bracket 2 by a support member 7, and a sub-pressure applying arm 35 having a distal end at which a sub-pressure unit 39 is provided. The sub-pressure actuator 31 includes a servomotor 32 composed of a hollow motor having a hollow rotor which is rotatably accommodated in a motor housing. The pressure actuator 20 further includes a linear motion unit 33, which has a ball screw attached to an end of the hollow rotor and a rod 34 screwed onto the ball screw. The rod 34 of the linear motion unit 33 is vertically reciprocated by the servomotor 32. The sub-pressure applying arm 35 is attached to the rod 34 of the linear motion unit 33.

The sub-pressure applying arm 35 includes an arm portion 36 and a movable receiving portion 38. The arm portion 36 has a base end connected to a distal end of the rod 34, extends downward between the fixed arm 10 and the electrode arm 24, and has a distal end portion 37 defining a distal end of the arm portion 36 and bending toward the central axis L. The movable receiving portion 38 is connected to the distal end portion 37 of the arm portion 36, extends toward the central axis L, and has a distal end at which the sub-pressure unit 39 is provided.

The movable receiving portion 38 is a rectangular plate that has a base end 38A connected to the distal end portion 37 of the arm portion 36 and that extends toward the direction of the central axis L. The sub-pressure unit 39 is provided at a distal end of the movable receiving portion 38. The sub-pressure unit 39 is coaxially aligned with the central axis L, has a distal end 39a projecting upward, and has a semicircular cross-sectional shape, i.e., a semi-cylindrical shape that allows the fixed electrode 15 to extend therethrough.

The sub-pressure applying arm 35 having the configuration described above is moved by the servomotor 32 along the central axis L between a retracted position which is away from the workpiece 100 and where the distal end 39a of the sub-pressure unit 39 provided at the distal end of the sub-pressure applying arm 35 is located below the tip end 15a of the fixed electrode 15 and a sub-pressure applying position where the distal end 39a comes into contact from below with the workpiece 100 held between the fixed electrode 15 and the movable electrode 25 and applies sub-pressure to the workpiece 100. This sub-pressure is dependent on the rotation torque of the servomotor 32. Accordingly, sub-pressure f of a desired magnitude can be obtained by controlling the rotation torque of the servomotor 32.

The welding transformer 40 serving as the power source has an output terminal electrically connected to the fixed electrode 15 through a bus bar, the fixed arm 10, etc., and the other output terminal electrically connected to the movable electrode 25 through a bus bar, the electrode arm 24, etc.

Further, a welding controller 41 is provided that includes an operation program of the spot welding apparatus 1. The welding controller 41 also includes a pressure control unit 42 which controls the pressure actuator 20 and a sub-pressure control unit 43 which controls the sub-pressure actuator 31 in accordance with each operational step that is set in the operation program.

As illustrated in FIG. 4, this welding controller 41 includes, as operation program data, an initial pressure setting step S101, a setting pressure setting step S102, an initial sub-pressure setting step S103, a sub-pressure setting step S104, an initial pressure step S105 and an initial sub-pressure step S106 as a first step, and a setting pressure step S107 and a setting sub-pressure step S108 as a second step.

The pressure control unit 42 sets, as operational data, an initial rotational torque T1 in the initial pressure setting step S101. The initial rotational torque T1 is a rotational torque of the servomotor 21 for pressing the workpiece 100 between the fixed electrode 15 and the movable electrode 25 with an initial pressure F1 that has been set in advance. The pressure control unit 42 also sets a setting rotational torque T in the setting pressure setting step S102. The setting rotational torque T is a rotational torque of the servomotor 21 for pressing the workpiece 100 between the fixed electrode 15 and the movable electrode 25 with a setting pressure F that has been set in advance. Then, in the initial pressure step S105, the pressure control unit 42 drives the servomotor 21 until the rotational torque of the servomotor 21 reaches the initial rotational torque T1 that has been set in the initial pressure setting step S101. Then, in the setting pressure step S107, the pressure control unit 42 drives the servomotor 21 until the rotational torque of the servomotor 21 reaches the setting rotational torque T that has been set in the setting pressure setting step S102.

The initial pressure F1 in the initial pressure setting step S101 is the sum of the initial setting pressure of the fixed electrode 15 and the initial setting pressure of the movable electrode 25 to be applied when pressing the workpiece 100 by the fixed electrode 15 and the movable electrode 25. The setting pressure F in the setting pressure setting step S102 is the sum of an optimum pressure FL of the fixed electrode 15 and an optimum pressure FU of the movable electrode 25 that are required for welding (F=FL+FU). The initial pressure F1 and the setting pressure F are preferably set in advance on the basis of experiments or simulations.

The sub-pressure control unit 43 sets, as operational data, an initial rotational torque t1 in the initial sub-pressure setting step S103. The initial rotational torque t1 is a rotational torque of the servomotor 32 for causing the sub-pressure unit 39 to apply to the workpiece 100 an initial sub-pressure f1 that has been set in advance. The sub-pressure control unit 43 also sets a setting rotational torque t in the sub-pressure setting step S104. The setting rotational torque t is a rotational torque of the servomotor 32 for causing the sub-pressure unit 39 to apply to the workpiece 100 a setting sub-pressure f that has been set in advance. Then, in the initial sub-pressure step S106, the sub-pressure control unit 43 drives the servomotor 32 until the rotational torque of the servomotor 32 reaches the initial rotational torque t1 that has been set in the initial sub-pressure setting step S103. Then, in the setting sub-pressure step S108, the sub-pressure control unit 43 drives the servomotor 32 until the rotational torque of the servomotor 32 reaches the setting rotational torque t that has been set in the sub-pressure setting step S104.

The initial sub-pressure f1 in the initial sub-pressure setting step S103 is a pressure to be set initially, and is smaller than the setting sub-pressure f. The setting sub-pressure f in the sub-pressure setting step S104 is set in the range of sub-pressure that is optimum for welding. The initial sub-pressure f1 and the setting sub-pressure f are preferably set in advance on the basis of experiments or simulations.

As described above, since the initial pressure, the setting pressure, the initial sub-pressure, and the setting sub-pressure are obtained by setting the rotational torques of the servomotors 21 and 32 of the respective pressure actuator 20 and the sub-pressure actuator 31, there is no need to separately provide pressure detecting means dedicated to detection of pressure and sub-pressure. This can simplify control and configuration.

Further, a welding-robot controller (not shown) stores teaching data for the welding robot. The teaching data contains an operation program for sequentially spot-welding the welding spots of the workpiece 100, and information on the position and attitude of the spot welding apparatus 1 at each welding spot, i.e., at each welding position.

Next, operations of the spot welding apparatus 1 will be described with reference to the schematic operational diagrams of FIGS. 5A through 5F and FIG. 6.

Upon spot-welding a workpiece 100 formed of a thin plate 101, a first thick plate 102, and a second thick plate 103 that are stacked in this order from the bottom, the initial rotational torque T1 of the servomotor 21 for pressing the workpiece 100 between the fixed electrode 15 and the movable electrode 25 with the initial pressure F1 is set as operational data of the pressure control unit 42 in advance in the initial pressure setting step S101. Also, the setting rotational torque T of the servomotor 21 for pressing the workpiece 100 between the fixed electrode 15 and the movable electrode 25 with the setting pressure F is set in the setting pressure setting step S102. Similarly, the initial rotational torque t1 of the servomotor 32 for causing the sub-pressure unit 39 to apply to the workpiece 100 the initial sub-pressure f1 is set as operational data of the sub-pressure control unit 43 in advance in the initial sub-pressure setting step S103. Also, the setting rotational torque t of the servomotor 32 for causing the sub-pressure unit 39 to apply to the workpiece 100 the setting sub-pressure f is set in the sub-pressure setting step S104. In this way, a preparation is made.

Subsequently, in accordance with a preset program, the movable electrode 25 is held at its retracted position away from the fixed electrode 15 and the sub-pressure unit 39 of the sub-pressure applicator 30 is held at its retracted position as shown in FIG. 1. Then, the robot controller actuates the welding robot so as to position the spot welding apparatus 1 such that the tip end 15a of the fixed electrode 15 comes into contact with a spot position, i.e., a welding position of the workpiece 100, as shown in FIG. 5A.

Figure 5A:
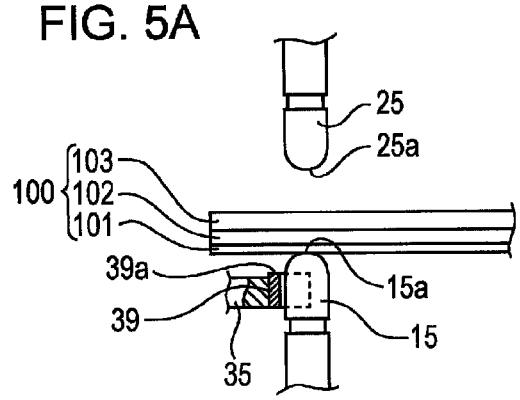
FIGS. 5A through 5F are diagrams schematically illustrating operations.

When the spot welding apparatus 1 is positioned at the welding position, as shown in FIG. 5A, the tip end 15a of the fixed electrode 15 of the spot welding apparatus 1 is in contact with the thin plate 101 of the workpiece 100 from below. On the other hand, a tip end 25a of the movable electrode 25 faces the second thick plate 103 with a gap therebetween, and the distal end 39a of the sub-pressure unit 39 faces the thin plate 101 with a gap therebetween.

Figure 5D:
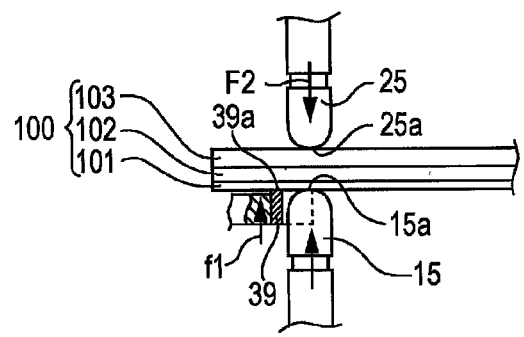
Figure 5B:
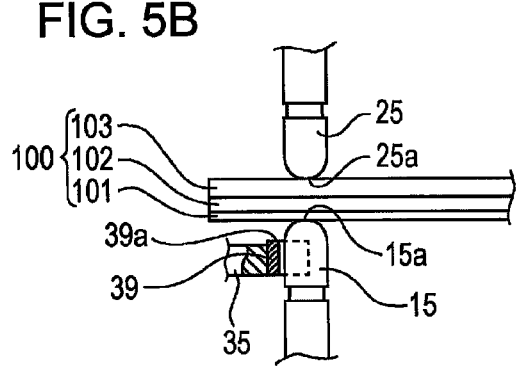

Subsequently, while having the fixed electrode 15 in contact with the thin plate 101 of the workpiece 100, the movable electrode 25 is moved by the servomotor 21 of the pressure actuator 20 from the retracted position to the pressure applying position, i.e., toward the fixed electrode 15, so as to be in contact with the second thick plate 103 from above as shown in FIG. 5B. The fixed electrode 15 and the movable electrode 25 hold the workpiece 100 therebetween, and thus the fixed electrode 15 and the movable electrode 25 are positioned at the spot position, i.e., the welding position of the workpiece 100.

Figure 5E:
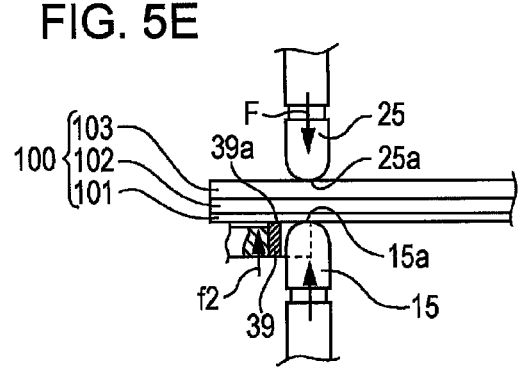
Figure 5C:
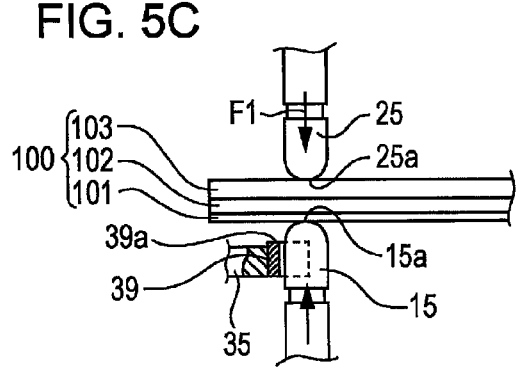

Then, in the initial pressure step S105 in the first step, the servomotor 21 of the pressure actuator 20 is driven until the rotational torque thereof reaches the initial rotational torque T1 which has been set in the initial pressure setting step S101. Thus, as shown in FIG. 5C, the workpiece 100 is held and pressed between the fixed electrode 15 and the movable electrode 25 with the initial pressure F1. As indicated by the solid line "a" in FIG. 6, the pressure applied to the workpiece 100 by the movable electrode 25 and the fixed electrode 15 holding the workpiece 100 therebetween in this initial pressure step S105 gradually increases with the rotation of the servomotor 21 until the pressure reaches the initial pressure F1.

Then, in the initial sub-pressure step S106, the servomotor 32 of the sub-pressure actuator 31 is driven until the rotational torque thereof reaches the initial rotational torque t1 which has been set in the initial sub-pressure setting step S103. Thus, as shown in FIG. 5D, the sub-pressure unit 39 is located adjacent to the fixed electrode 15 and comes into pressure contact from below with the thin plate 101 of the workpiece 100 held and pressed between the fixed electrode 15 and the movable electrode 25, so that the initial sub-pressure f1 is applied to the workpiece 100.

Figure 6:
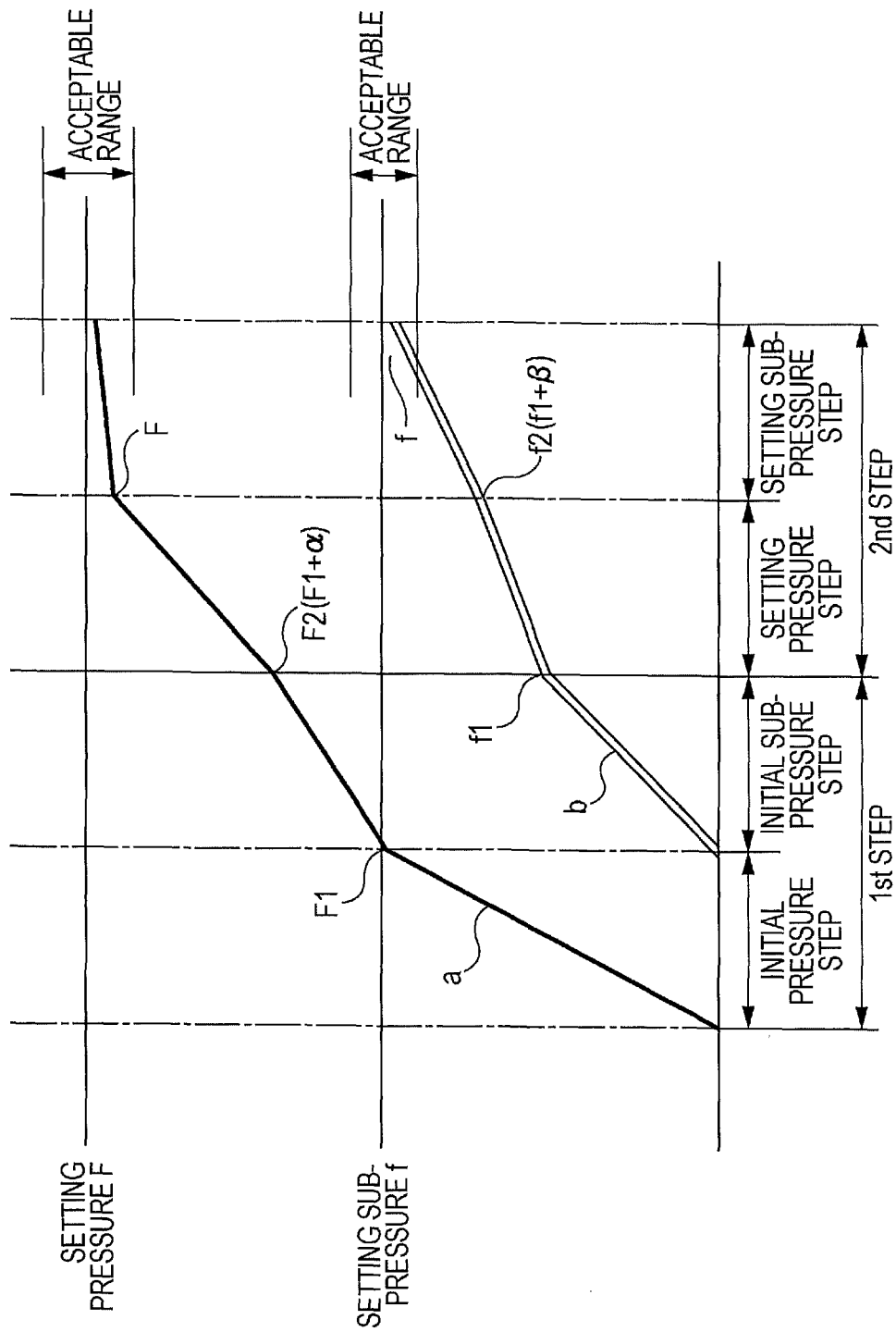
FIG. 6 is a diagram schematically illustrating operations.
Figure 9:
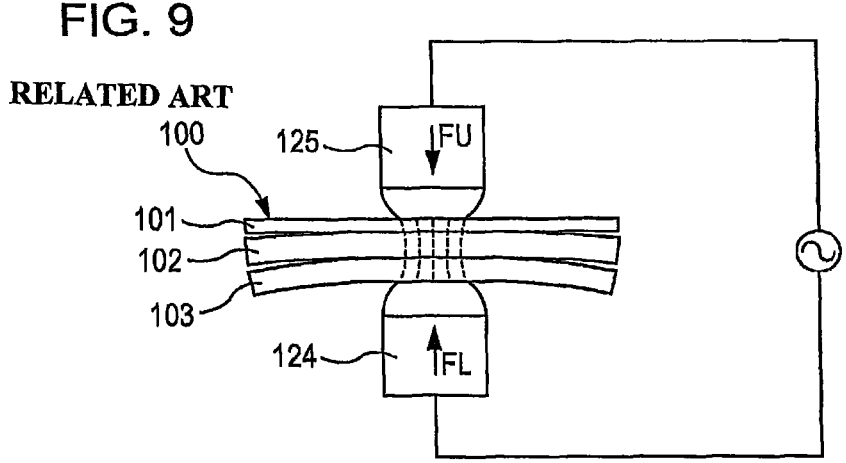
FIG. 9 is a diagram schematically illustrating a spot welding process according to related art.
Figure 10:
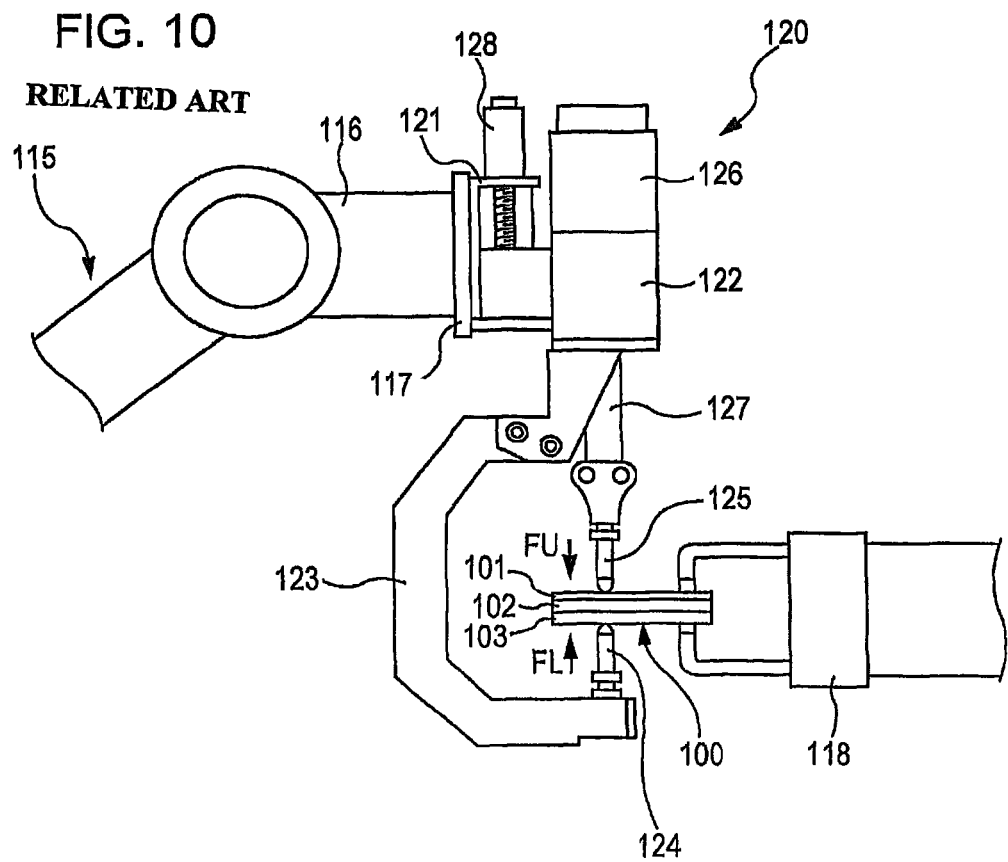
FIG. 10 is a diagram schematically illustrating a spot welding process according to related art.
Figure 11:
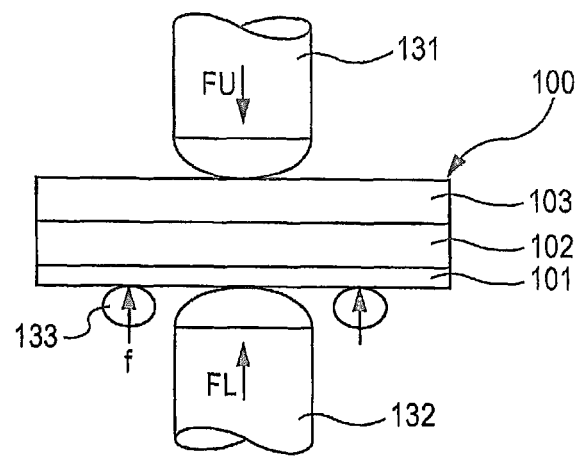
FIG. 11 is a diagram schematically illustrating a spot welding apparatus.

As indicated by the double line "b" in FIG. 6, the sub-pressure applied to the workpiece 100 by the sub-pressure unit 39 in this initial sub-pressure step S106 gradually increases with the rotation of the servomotor 32 until the pressure reaches the initial sub-pressure f1.

In this first state, with application of the initial sub-pressure f1, the reaction force resulting from this increasing sub-pressure is applied from the sub-pressure unit 39 through the sub-pressure applying arm 35 and through the mechanical resistance of the sub-pressure actuator 31, such as the mechanical resistance of the servomotor 32 and the linear motion unit 33, to the movable electrode 25 and the fixed electrode 15. Thus, as shown in FIG. 6, the pressure by the movable electrode 25 and the fixed electrode 15 increases from the initial pressure F1 to a secondary pressure F2 (F1+α) as shown in FIG. 6.

With regard to the application of the initial pressure F1 in the initial pressure step S105 and the application of the initial sub-pressure f1 in the initial sub-pressure step S106, the initial sub-pressure step S106 may be performed first, and the initial pressure step S105 may be performed after the initial sub-pressure step S106. That is, in the first step, one of the preset initial pressure F1 by the pressure actuator 20 through the fixed electrode 15 and the movable electrode 25 holding and pressing the workpiece 100 therebetween and the preset initial sub-pressure f1 by the sub-pressure actuator 31 through the sub-pressure unit 39 is applied to the workpiece 100 first, and then the other one is applied.

After this first step, in the setting pressure step S107 in the second step, the servomotor 21 is driven until the rotational torque thereof reaches the setting rotational torque T, which has been set in the setting pressure setting step S102. Thus, as shown in FIG. 5E, the workpiece 100 is held and pressed between the fixed electrode 15 and the movable electrode 25 with the setting pressure F. As a result, as shown in FIG. 6, the pressure applied to the workpiece 100 by the movable electrode 25 and the fixed electrode 15 is increased from the increased secondary pressure F2 in the initial sub-pressure step S106 to the preset setting pressure F required for welding.

With application of the setting pressure F, the reaction force resulting from application of this pressure is applied through the mechanical resistance of the pressure actuator 20 and the sub-pressure actuator 31 and through the sub-pressure applying arm 35 and the like to the sub-pressure unit 39. Thus, as shown in FIG. 6, the sub-pressure by the sub-pressure unit 39 increases from the initial sub-pressure f1 to a secondary sub-pressure f2 (f1+β).

Figure 5F:
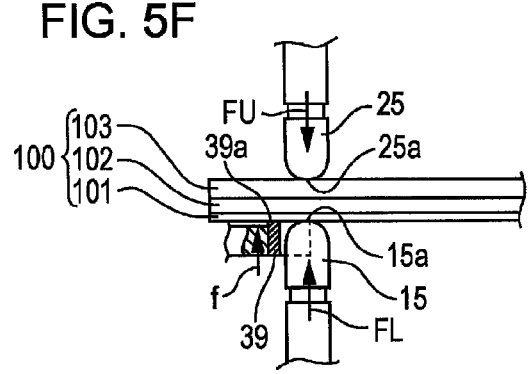

Then, in the setting sub-pressure step S108, the servomotor 32 of the sub-pressure actuator 31 is driven until the rotational torque thereof reaches the setting rotational torque t, which has been set in the sub-pressure setting step S104. Thus, as shown in FIG. 5F, the setting sub-pressure f is applied to the thin plate 101 of the workpiece 100. As a result, as shown in FIG. 6, the pressure applied to the workpiece 100 by the sub-pressure unit 39 is increased from the increased secondary sub-pressure f2 in the setting pressure step S107 to the setting sub-pressure f required for welding.

The reaction force resulting from the increase from the secondary sub-pressure f2 to the setting sub-pressure f by this sub-pressure setting is applied to the movable electrode 25 and the fixed electrode 15 so as to increase the setting pressure F, which has been set in the setting pressure step S107. However, the reaction force resulting from the increase from the secondary sub-pressure f2 to the setting sub-pressure f is relatively small, and therefore the setting pressure F is maintained within an acceptable range.

With regard to the application of the setting pressure F in the setting pressure step S107 and the application of the setting sub-pressure f in the setting sub-pressure step S108, the setting sub-pressure step S108 may be performed first, and the setting pressure step S107 may be performed after the setting sub-pressure step S108. That is, in the second step, one of the preset setting pressure F by the pressure actuator 20 through the fixed electrode 15 and the movable electrode 25 and the setting sub-pressure f by the sub-pressure actuator 31 through the sub-pressure unit 39 is applied to the workpiece 100 first, and then the other one is applied.

In this second state in which the workpiece 100 is held and pressed between the fixed electrode 15 and the movable electrode 25 with the setting pressure F set in accordance with the welding conditions, and in which the sub-pressure f, i.e., the setting sub-pressure f, is applied to the workpiece 100 from below by the sub-pressure unit 39 located adjacent to the fixed electrode 15 in the manner described above, the pressure FU of the movable electrode 25 is applied to the second thick plate 103 of the workpiece 100 from above, whereas the pressure FL of the fixed electrode 15 and the sub-pressure f of the sub-pressure unit 39 are applied next to each other to the thin plate 101, as shown in FIG. 5F.

In this case, the pressure of the pressure actuator 20 is applied to the movable electrode 25 through the electrode arm 24, etc., and is also applied to the fixed electrode 15, facing the movable electrode 25, through the fixed arm 10. Meanwhile, an urging force of the servomotor 32 of the sub-pressure applicator 30 is applied to the sub-pressure unit 39 through the sub-pressure applying arm 35, etc. The pressure FU of the movable electrode 25 applied to the second thick plate 103 from above is equal to the sum of the pressure FL of the fixed electrode 15 and the sub-pressure f of the sub-pressure unit 39 that are applied to the thin plate 101 from below (FU=FL+f).

In other words, the pressure FL applied from the fixed electrode 15 to the thin plate 101 is equal to a pressure obtained by subtracting the sub-pressure f of the sub-pressure unit 39 from the pressure FU of the movable electrode 25 (FL=FU−f).

When the pressure FL of the fixed electrode 15 applied to the thin plate 101 side is set to be lower than the pressure FU of the movable electrode 25 applied to the second thick plate 103 side (FL<FU) as described above, the contact pressure at the joint section between the thin plate 101 and the first thick plate 102 becomes smaller than the contact pressure at the joint section between the first thick plate 102 and the second thick plate 103. Consequently, the contact resistance between the thin plate 101 and the first thick plate 102 becomes relatively higher, whereas the contact resistance between the first thick plate 102 and the second thick plate 103 becomes relatively lower.

Subsequently, while the workpiece 100 is clamped and pressed between the movable electrode 25 and a combination of the fixed electrode 15 and the sub-pressure unit 39 and while the pressure FL of the fixed electrode 15 located at the thin plate 101 side is set to be lower than the pressure FU of the movable electrode 25 located at the second thick plate 103 side, welding is performed by applying a current between the movable electrode 25 and the fixed electrode 15 from the welding transformer 40 for a predetermined time period.

When a current is applied between the movable electrode 25 and the fixed electrode 15, the contact resistance at the joint section between the thin plate 101 and the first thick plate 102 becomes relatively higher, making the current density greater, whereas the contact resistance between the first thick plate 102 and the second thick plate 103 remains low. Thus, the calorific value at the joint section between the thin plate 101 and the first thick plate 102 becomes relatively higher than the calorific value at the joint section between the first thick plate 102 and the second thick plate 103. Consequently, a good nugget is formed that extends from the thin plate 101 to the second thick plate 103 without a variation in the current density, thereby ensuring a high weld strength of the thin plate 101.

After completion of this welding process, the rod 34 of the linear motion unit 33 is moved downward by the servomotor 32 of the sub-pressure applicator 30, whereby the sub-pressure applying arm 35 is moved such that the sub-pressure unit 39 provided at the distal end of the movable receiving portion 38 moves from the sub-pressure applying position, where the sub-pressure unit 39 is in pressure contact with the workpiece 100, to the retracted position. Further, the movable electrode 25 is moved from the pressure applying position to the retracted position by the servomotor 21 of the pressure actuator 20 such that the workpiece 100 is released from being held by the fixed electrode 15 and the movable electrode 25.

Subsequently, the welding robot is operated in accordance with the operation program so as to cause the spot welding apparatus 1 to retract from the spot position of the workpiece 100 and move to the next spot position of the workpiece 100.

According to the present embodiment having the configuration described above, since the sub-pressure f of the sub-pressure actuator 31 is applied to the workpiece 100 to which the appropriate pressure F of the fixed electrode 15 and the movable electrode 25 have been applied without being affected by the mechanical resistance of the pressure actuator 20 and the like, the pressures FL and FU of the fixed electrode 15 and the movable electrode 25 are controlled. This improves the welding quality of the workpiece 100 formed of stacked plates of different rigidities.

It should be noted that the present invention is not limited to the foregoing embodiment, and various modifications may be made without departing from the scope of the present invention. For example, in the above embodiment, the fixed electrode 15 and the movable electrode 25 press the workpiece 100 with the initial pressure F1 in the initial pressure step S105; the sub-pressure of the initial pressure F1 is applied in the initial sub-pressure step S106; the fixed electrode 15 and the movable electrode 25 further press the workpiece 100 with the setting pressure F appropriate for welding in the setting pressure step S107; and the setting sub-pressure f appropriate for welding is further applied in the setting sub-pressure step S108. Thus, the pressure F by the fixed electrode 15 and the movable electrode 25 and the sub-pressure f with respect to the workpiece 100 that satisfy the welding conditions are obtained. However, a shifting step may be provided. In the shifting step, the first state in which the workpiece 100 is held and pressed with the initial pressure between the fixed electrode 15 and the movable electrode 25 and the initial sub-pressure is applied to the workpiece 100 through the sub-pressure unit 39 is gradually shifted to the second state in which the preset setting pressure F is applied to the workpiece 100 by the pressure actuator 20 through the fixed electrode 15 and the movable electrode 25 and the preset setting sub-pressure f is applied to the workpiece 100 by the sub-pressure actuator 31 through the sub-pressure unit 39.

This shifting step will be described with reference to the schematic operational diagram of FIG. 7.

As in the case of the above embodiment, in the first step, the initial pressure F1 is applied to the workpiece 100 by the pressure actuator 20 through the movable electrode 25 and the fixed electrode 15 in the initial pressure step S105, and the initial sub-pressure f1 is applied to the workpiece 100 by the sub-pressure actuator 31 through the sub-pressure unit 39 in the initial sub-pressure step S106. Then, in the shifting step from this first state, a plurality of pressure steps in which the initial pressure F1 by the pressure actuator 20 through the movable electrode 25 and the fixed electrode 15 is gradually shifted to the preset setting pressure F and a plurality of sub-pressure steps in which the initial sub-pressure f1 by the sub-pressure actuator 31 through the sub-pressure unit 39 is gradually shifted to the setting sub-pressure f are alternately performed so as to apply the setting pressure and the setting sub-pressure to the workpiece 100.

Thus, the preset pressure by the fixed electrode 15 and the movable electrode 25 and the preset sub-pressure by the sub-pressure unit 39 are applied to the workpiece 100 with high accuracy. Then, current is applied between the fixed electrode 15 and the movable electrode 25 so as to perform spot welding on the workpiece 100 to which the preset pressure is applied by the fixed electrode 15 and the movable electrode 25 and the preset sub-pressure is applied by the sub-pressure unit 39. Thus, high welding quality is achieved.

It is to be noted that, there may be provided a step of reducing at least one of the pressure by the fixed electrode 15 and the movable electrode 25 and the sub-pressure by the sub-pressure unit 39 while gradually shifting to the second state in which the preset setting pressure F is applied to the workpiece 100 by the pressure actuator 20 through the fixed electrode 15 and the movable electrode 25 and the preset setting sub-pressure f is applied to the workpiece 100 by the sub-pressure actuator 31 through the sub-pressure unit 39. This prevents excess pressure or excess sub-pressure from being applied and allows the preset pressure by the fixed electrode 15 and the movable electrode 25 and the preset sub-pressure by the sub-pressure unit 39 to be applied to the workpiece 100 with higher accuracy.

Further, in the above embodiment, the pressure by the fixed electrode 15 and the movable electrode 25 is controlled by controlling the rotational torque of the servomotor 21, and the sub-pressure is controlled by controlling the rotational torque of the servomotor 32. However, a load cell for detecting the pressure by the fixed electrode 15 and the movable electrode 25 may be provided in the fixed arm 10, the electrode arm 24, or the like such that the pressure may be set on the basis of the detection results of the load cell. Similarly, a load cell for detecting the sub-pressure by the sub-pressure unit 39 may be provided in the sub-pressure applying arm 35 or the like such that the sub-pressure may be set on the basis of the detection results of the load cell. In this case, the setting pressure and the setting sub-pressure can be set with higher accuracy.

What is claimed is:

1. A pressure control method for a spot welding apparatus, wherein the spot welding apparatus includes a first welding electrode; a pressure actuator configured to apply a pressure to a second welding electrode, the electrodes holding therebetween a workpiece; and a sub-pressure actuator configured to bring a sub-pressure unit into contact with the workpiece so as to apply a sub-pressure to the workpiece; and wherein the spot welding apparatus is configured to perform spot welding on the workpiece by applying current between the first welding electrode and the second welding electrode to which a preset pressure is applied while holding the workpiece by using the first welding electrode, the second welding electrode, and the sub-pressure unit; the pressure control method comprising:

a first step of applying to the workpiece one of a preset initial pressure by the pressure actuator through the first welding electrode and the second welding electrode holding and pressing the workpiece therebetween and a preset initial sub-pressure by the sub-pressure actuator through the sub-pressure unit being in contact with the workpiece, and subsequently applying the other one of the initial pressure and the initial sub-pressure; and a second step of applying to the workpiece one of a preset setting pressure by the pressure actuator through the first welding electrode and the second welding electrode and a preset setting sub-pressure by the sub-pressure actuator through the sub-pressure unit, and subsequently applying the other one of the preset setting pressure and the preset setting sub-pressure, the second step being performed after the first step, wherein the first step and second step are alternately repeated until an acceptable range is reached.

2. A pressure control method for a spot welding apparatus, wherein the spot welding apparatus includes a first welding electrode; a pressure actuator configured to apply a pressure to a second welding electrode, the electrodes holding therebetween a workpiece; and a sub-pressure actuator configured to bring a sub-pressure unit into contact with the workpiece so as to apply a sub-pressure to the workpiece; and wherein the spot welding apparatus is configured to perform spot welding on the workpiece by applying current between the first welding electrode and the second welding electrode to which a preset pressure is applied while holding the workpiece by using the first welding electrode, the second welding electrode, and the sub-pressure unit; the pressure control method comprising:

a first step of applying to the workpiece one of a preset initial pressure by the pressure actuator through the first welding electrode and the second welding electrode holding and pressing the workpiece therebetween and a preset initial sub-pressure by the sub-pressure actuator through the sub-pressure unit being in contact with the workpiece, and subsequently applying the other one of the preset initial pressure and the preset initial sub-pressure; and a shifting step of gradually shifting from a first state in which the workpiece is held and pressed with the initial pressure between the first welding electrode and the second welding electrode and the initial sub-pressure is applied to the workpiece through the sub-pressure unit to a second state in which a preset setting pressure is applied to the workpiece by the pressure actuator through the first welding electrode and the second welding electrode and a preset setting sub-pressure is applied to the workpiece by the sub-pressure actuator through the sub-pressure unit, wherein the first step and shifting step are alternately repeated while increasing the pressure until an acceptable range is reached.

3. The pressure control method for a spot welding apparatus according to claim 2, wherein in the shifting step, pressure application by the pressure actuator through the first welding electrode and the second welding electrode and sub-pressure application by the sub-pressure actuator through the sub-pressure unit are alternately performed.

4. The pressure control method for a spot welding apparatus according to claim 2, wherein the shifting step includes a plurality of sub-pressure steps of performing sub-pressure application by the sub-pressure actuator through the sub-pressure unit.

5. The pressure control method for a spot welding apparatus according to claim 2, wherein the shifting step includes a step of reducing at least one of the pressure applied through the first welding electrode and the second welding electrode and the sub-pressure applied through the sub-pressure unit while gradually shifting to the second state in which the preset setting pressure is applied to the workpiece by the pressure actuator through the first welding electrode and the second welding electrode and the preset setting sub-pressure is applied to the workpiece by the sub-pressure actuator through the sub-pressure unit.

6. The pressure control method for a spot welding apparatus according to claim 3, wherein the shifting step includes a step of reducing at least one of the pressure applied through the first welding electrode and the second welding electrode and the sub-pressure applied through the sub-pressure unit while gradually shifting to the second state in which the preset setting pressure is applied to the workpiece by the pressure actuator through the first welding electrode and the second welding electrode and the preset setting sub-pressure is applied to the workpiece by the sub-pressure actuator through the sub-pressure unit.

7. The pressure control method for a spot welding apparatus according to claim 4, wherein the shifting step includes a step of reducing at least one of the pressure applied through the first welding electrode and the second welding electrode and the sub-pressure applied through the sub-pressure unit while gradually shifting to the second state in which the preset setting pressure is applied to the workpiece by the pressure actuator through the first welding electrode and the second welding electrode and the preset setting sub-pressure is applied to the workpiece by the sub-pressure actuator through the sub-pressure unit.

8. The pressure control method for a spot welding apparatus according to claim 1, wherein the preset initial pressure and the preset initial sub-pressure have a different value.

9. The pressure control method for a spot welding apparatus according to claim 2, wherein the preset initial pressure and the preset initial sub-pressure have a different value.

10. The pressure control method for a spot welding apparatus according to claim 1, wherein the pressure applied by the pressure actuator has a different value than the sub-pressure applied by the sub-pressure actuator.

11. The pressure control method for a spot welding apparatus according to claim 2, wherein the pressure applied by the pressure actuator has a different value than the sub-pressure applied by the sub-pressure actuator.

* * * * *